Aug. 8, 1939.    J. B. BRADSHAW    2,168,930
HIGHWAY GUARD
Filed March 11, 1938    2 Sheets-Sheet 1
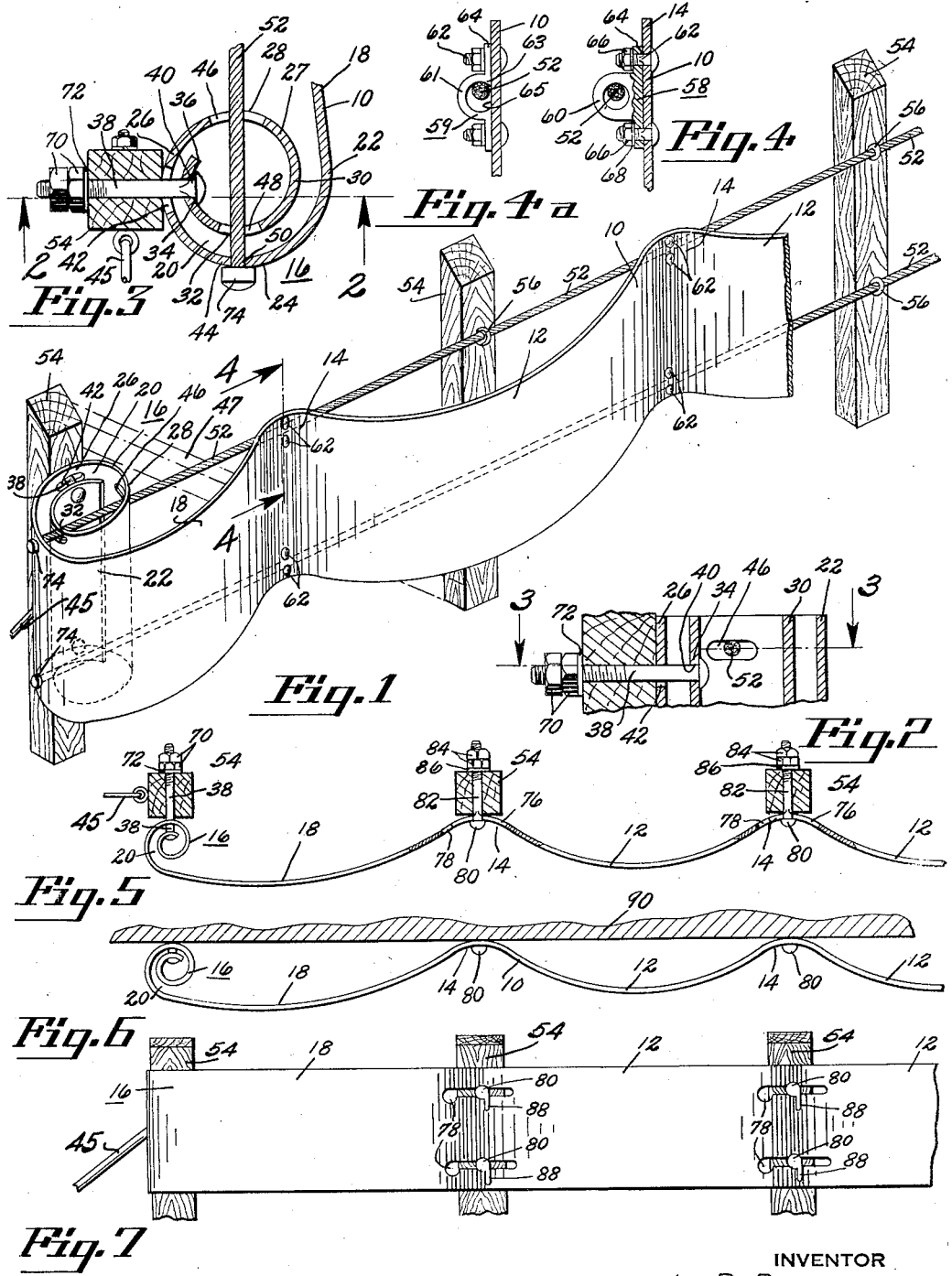
INVENTOR
JOE B. BRADSHAW
BY
Russell C. Lane
ATTORNEY Aug. 8, 1939.  J. B. BRADSHAW  2,168,930
HIGHWAY GUARD
Filed March 11, 1938  2 Sheets-Sheet 2
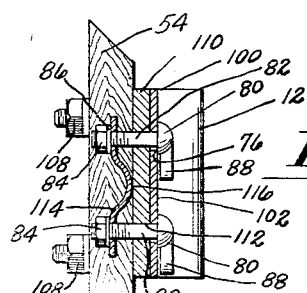
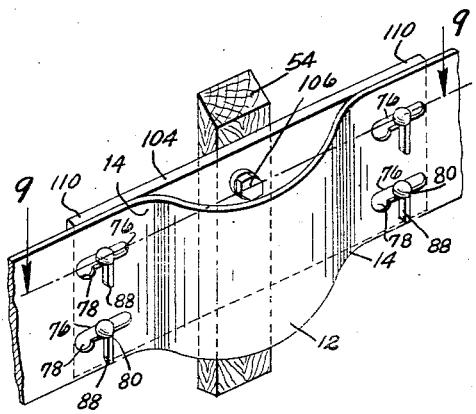
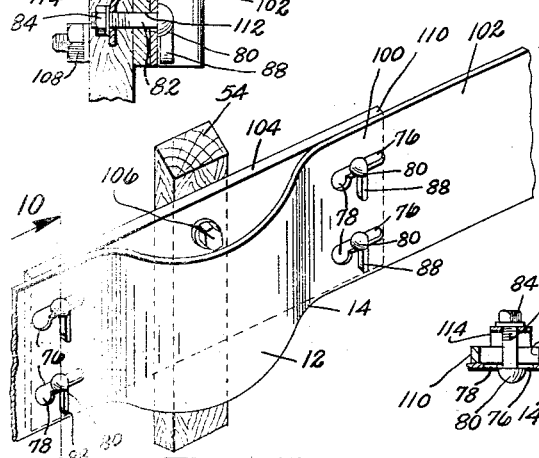
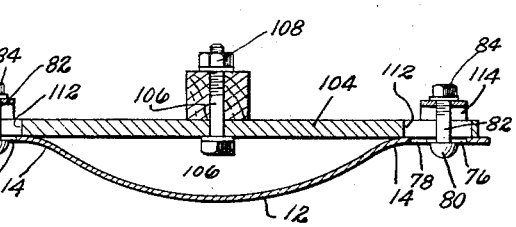
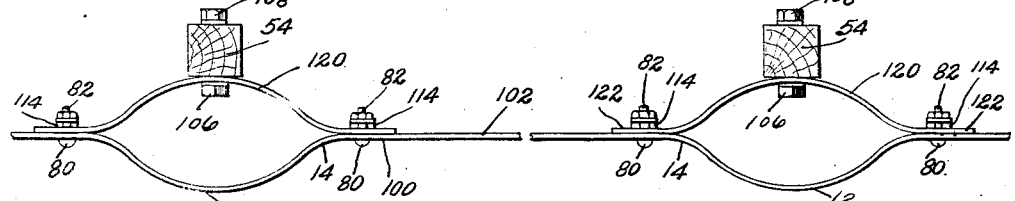
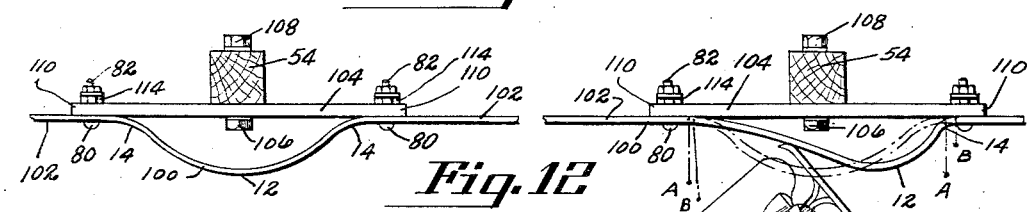
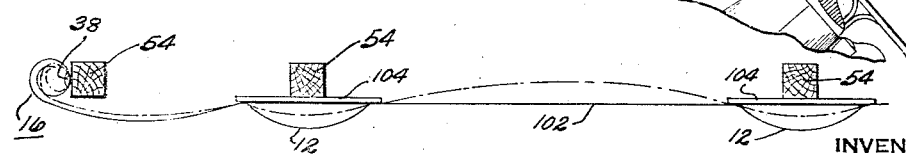
INVENTOR
JOE B. BRADSHAW
BY
Russell O. Lane
ATTORNEY Patented Aug. 8, 1939

2,168,930

UNITED STATES PATENT OFFICE 2,168,930

HIGHWAY GUARD

Joe B. Bradshaw, Stanford, Ky.

Application March 11, 1938, Serial No. 195,244

19 Claims. (Cl. 256—13.1)

This invention relates to guard devices for danger or hazard points along a traffic bearing way, and/or thoroughfare, and has for an object to provide maximum protection for an impacting vehicle, with a minimum of damage to the impacting vehicle and the guard device, resulting from directed or deflected movement of a vehicle from the intended line of progress.

With guard devices of the prior art there has been the practically common fault in their failure to effectively stop and in some cases even restrain an impacting vehicle. Upon forceful impact, there has been attendant more or less rupture or destruction of the guard-rail devices, and there is an almost complete failure to right the engaging vehicle, or redirect it along its line of intended movement. These faults lie principally with the unyielding, or relatively non-yielding, or insufficient yielding properties of the guard-rail structures that have been used. Though the prior art includes formed metallic bands or strips, with cushioning means for supporting them, they are generally inadequately designed to function efficiently without either rupture to themselves, or material damage to the impacting vehicle with which they might become entangled or serious injury to both.

An efficient guard-rail device should be so designed and calibrated as to stand the strain of impact from a massive vehicle like a heavily loaded truck, and by its operation successfully bring the vehicle to rest, without the parts of the guard-rail device giving way to allow the obstacle to entirely leave the thoroughfare and without the parts of the guard-rail becoming so distorted as to be useless during a second encounter. Further, that same guard-rail device should be capable of withstanding the shock of impact without destruction beyond utility for a second, or repeated encounters. On the other hand, the same guard-rail device must function properly to receive the impact from a lighter vehicle, and efficiently operate to save it from overturn or from entirely leaving the highway, and do so with the least consequential damage to either the guard-rail device, or the impacting vehicle.

While it is recognized that guard-rail devices are impossible of fabrication to the extent that they will not be damaged by continued use, and successive engagements from erratically moving vehicles, it is also recognized that their efficiency and useful life can be greatly increased by simple changes of construction. It is, therefore, desirable to provide guard-rail mechanisms that are readily adapted for repair or replacements with respect to damaged sections, since subsequent impacts may take place during the interim between damage and the heretofore necessary time elapse for repair or replacement. Thus, convenient replacement of damaged parts occupies an important part in guard-rail design.

It is therefore an object of this invention to provide a guard-rail device that will firmly but yieldably withstand the shock of recurring vehicular impacts, and that will operate to bring the vehicle to a stop in substantially redirected line of motion, with the least possible damage to the rail itself, and to the encountering vehicle.

It is a further object of the invention to provide a guard-rail structure that, upon impact, will yieldably arrest or check a vehicle in its mis-directed movement, and that will distribute the shock of impact from the vehicle to an extended portion of the guard-rail system.

It is a further object of the invention to provide a guard-rail device of resilient construction that will absorb the shock of impact, and distribute the force of impact at other than a localized point of the guard-rail system.

A further object of the invention is to provide a guard-rail member of undulating formation, with yielding supports therefor, whereby severe impact may be received without material damage to the guard-rail system.

A further object of this invention is to provide a wave-like, or undulating guard-rail, with means slidably supporting the rail at the wave extremities, whereby each wave portion functions substantially as an independent spring to receive the shock of impact and arrest an encountering vehicle.

A further object of the invention is to provide a yieldable support for an undulating guard-rail strip whereby the resiliency of the guard-rail system may be maintained throughout its installation.

A further object of this invention is to provide a yieldable or spring support for the ends of a guard-rail band, whereby forces applied to the guard-rail band at a remote point may be transmitted to an extended portion of the guard-rail band for a substantial distance on either side of the point of impact.

A further object of the invention is to provide a guard-rail structure that will afford firm but yieldable resistance to an impacting vehicle whether the impact be normal to the longitudinal extent of the guard-rail system, or whether it be at some acute angle to the general direction of the guard-rail extension.

A further object of the invention is to provide a resilient terminal support for a guard-rail construction that will facilitate either longitudinal or lateral movement of the guard-rail device when impacted.

A further object of this invention is to provide a guard-rail band, that is longitudinally waved in the order of a cycloid, whereby alternating crests of the waves are adapted to support the band with the intervening crests spaced from the support and facing the traffic.

A further object is to provide a wave-like guard-rail member that is adapted to be supported on line cables, posts, or on flat wall structures without posts, and in all cases function as a firm but yieldable guard-rail device.

Further objects and advantages of the present invention will be apparent from the following description, reference being had to the accompanying drawings wherein a preferred embodiment of the present invention is clearly shown.

In the drawings:

Fig. 1 is a perspective view of one form of the guard-rail device, wherein an undulating band is yieldably supported on a pair of cables.

Fig. 2 is a sectional view, through the spring roll or coil support at one end of the guard-rail strip, substantially as indicated by the line and arrows 2—2 of Fig. 3.

Fig. 3 is a sectional view, through the spring coil support, substantially as indicated by the line and arrows 3—3 of Fig. 2.

Fig. 4 is a fragmentary sectional view, with parts shown in elevation substantially as indicated by the line and arrows 4—4 of Fig. 1.

Fig. 4a is a detail view, showing a modified form of band supporting clip.

Fig. 5 is a top plan view of the guard-rail device, and illustrates a modification of the mounting means for the undulating band, wherein the guard-rail strip is mounted directly upon posts without the supporting cables, parts of the rail being broken away to show details of the guard-rail support.

Fig. 6 is a top plan view of the same guard-rail, and illustrates a further modification in the support therefor, showing its adaptability to be mounted upon a flat surface or wall.

Fig. 7 is an elevational view of the guard-rail band when attached to a supporting structure.

Fig. 8 is a perspective view of a modified form of the guard-rail band, wherein the wave portions thereof are connected by plane-like or relatively flat portions.

Fig. 9 is a longitudinal sectional view, of the means for yieldably supporting the guard-rail band upon a bracket member, the view being that substantially indicated by the line and arrows 9—9 of Fig. 8.

Fig. 10 is a detail in sectional view, further illustrating the manner of supporting the band upon the bracket member, the section being taken substantially on the line 10—10 of Fig. 8.

Fig. 11 is a plan view, of a second modification of the guard-rail device, wherein the guard-rail band of Fig. 8 is supported by yieldable bracket members.

Fig. 12 is a view in plan or the form of rail illustrated in Fig. 8, illustrating reactions of the contributing parts of the guard-rail upon impact from a vehicle.

Fig. 13 is a schematic view on a reduced scale, showing one type of guard-rail installation reacting to vehicle impact.

The above-mentioned faults are overcome, and the objects stated herein are accomplished by preforming a steel strip of the desired gauge and dimensions, into an undulating band, having oppositely disposed wave crests running across or transverse of the strip, with each set of wave crests lying on either side of the original plane of the stock. End sections of the guard-rail members are further fashioned with an open scroll or roll at one end thereof to provide a terminal mounting. The preformed guard-rail member 10 is then mounted on a firm support, with one set of wave crests slidably connected to the support, and with the intervening wave crests spaced from the support means, while the whole rail assembly is capable of both lateral and longitudinal movement incident to impact, which may be accomplished by bending of the unattached wave crest portions, and flexing of the terminal scroll. In the preferred form of installation, the yielding function of the guard-rail device is accentuated by cables stretched along the line of posts, with the intermediate sections of the rail slidably supported from the cables, thus providing a yieldable support for a yieldable guard-rail.

With specific reference to the drawings, 10 refers to a preferred form of guard rail illustrating the instant invention. The rail 10 is preformed from strip steel or the like to include a series of wave portions 12 of wide gradual curvature merging into intervening reverse bends 14 of relatively narrow curvature. The rail members 10 are preferably of such length to extend throughout the guard-rail system, but may be fabricated into convenient lengths or sections available for assembly on the job to provide the desired length of service installation. The ends of the rail member 10, or the end sections thereof are fashioned into a terminal coil to provide resiliency of the mount, and to accommodate longitudinal shifting of the rail. In accomplishing this, I further preform the strip or band 10 into a loosely wound cylinder 16, by rolling one end of an end wave upon itself about an axis parallel to, but spaced from the plane of the strip stock. The remaining portion of the end wave thus deformed is indicated at 18.

In fashioning the terminal coil 16, I prefer that it be integral with the body of the undulating rail 10, and that it consist of at least one and one-half convolutions before it merges into the deformed wave 18. The resultant formation is that likened unto a spiral, in which the successive convolutions are radially separated or spaced sufficiently to be free from engagement with one another, as indicated at 20. Thus, the deformed wave 18 integrally joins the beginning end of the outer spire at 22, which outer half spire 24 curves around behind the wave portion 18, to a point 26 substantially opposite the juncture 22, from which point 26 it continues to make an additional complete spire 27 passing through the points 28, 30, 32 and 34, ending at 36, the extreme end of the rail stock before forming. The convolutions of the spiral are pierced or apertured at the points 26 and 34 for passage of a supporting member 38. The aperture 40, at the point 34 is adapted to receive the member 38 in non-rotative engagement, while the aperture 42 at the point 26 constitutes a slot or other aperture of sufficient area to allow movement of the scroll part transverse of the member 38, so as to allow for expansion or contraction of the terminal support. The scroll is further fashioned at points 28, 32 and 44 by apertures 46, 48 and 50 respectively, to permit the passage of a cable 52, the apertures 46 and 48 constituting slots or enlarged openings permitting relative shifting of the spiral convolutions, while the aperture 50 is a plain aperture permitting simple passage of the cable 52 therethrough.

The apertured portions of the terminal member are situated at both ends of the cylindrical part, so that provisions are made for securing the terminal member, and for receiving a cable near each edge of the bend or strip 10. The undulating guard-rail thus preformed is adapted for diversified mounting, and as illustrated in Fig. 1, contemplates a line or series of spaced supports in the nature of posts 54, to which the cables 52 are secured in the usual manner, as by J-bolts 56. In that installation, along both edges of the plate 10, at each of the short radius bends 14, slidable attachment of the band is made to the cables 52. The slidable attachment constitutes a clip 58 having an enlarged eye or ring 60 through which the cable 52 is adapted to slide freely. Bolts 62 passing through the rail portion 14, and apertures of lugs 64 of the clip 58 are provided with nuts 66 and lock washers 68 that secure the clips 58 to the rail. As an alternative for the eye clip 58, a U-clip 59 may be secured to band 10 in its stead, and thereby provide for more ready removal and replacement due to wear. Here the lugs 64 are apertured as before for the reception of the attaching bolts 62, but the yoke 61 surrounding the cable 52 has its junctures with the lugs 64 drawn in toward each other as indicated at 63, thus leaving an opening 65 sufficient to span the cable when assembly is made. The inclination of the inner surface of the part 63 will operate to keep the cable from sliding to and from the rail it supports.

In mounting the terminal coil 16, the inner spire 27 is telescoped along the axis of the spiral, first in one direction, sufficiently to permit insertion of the bolt or supporting member 38 in the apertures 40 and 42, and to pass the bolt head over the edge of the spire 27 opposite the point 30. Then the coil is telescoped along the axis in the opposite direction, and the second of the bolts 38 put in place. When the bolts 38 are so adjusted that the heads thereof engage against the strip end 36, then the bolts 38 may be passed through holes in the post 54, where they are secured by double nuts 70, one of which engages a washer 72. In cases where the stock of the band or strip forming the coil is so heavy or stiff as to render the aforementioned telescoping of coil inconvenient, or where for other reasons it is undesirable to so attach the coil, the bolts 38 or equivalent supporting members may be first inserted through the post 54, and thence threaded through the holes or apertures 42 and 40 in the order mentioned and the nut or nuts affixed to the bolts inside of the coil to engage against the end 36. A socket wrench will facilitate tightening in that instance. Cables 52 being loosely attached to the intervening posts 54, and threaded through the eye pieces 60, or 61 as the case may be, have their ends passed through the apertures 46, 48 and 50 of the coil 16, whereupon the cables are tightened, and secured with an anchor or abutment piece 74, engaging the outer spire of the coil in the region of the point 44. If the coil be mounted on an end post it may be anchored by the rod 45, or braced by the strut 47, or both. Once the cables 52 have been tightened, the J-bolts 56 may be drawn up to firmly secure the cables 52 to the posts 54.

The guard-rail assembly thus installed accomplishes a yieldable support throughout the entire extent of the preformed rail. This is accomplished by the bolt 38 passing through the two convolutions of the spiral, and being drawn up enough to diminish the space 20 between the succesive turns in the region of the points 26 and 34. That presses the outside of the coil in the region of the point 26 against the front face of the post 54, and also forces the end 36 toward the outer spire in the region of point 26. That allows slippage to occur between the coils and post incident to expansion and contraction of the coil. Also, the cables supporting the preformed band or strip at points intermediate the posts 54, even though tightened against the coil 16, may yield to forces applied to the rail member. Any forces tending to stretch the cables will be transmitted through the cables to the terminal coil 16, where some distortion may ensue in the nature of compensatory movement. While Fig. 1 illustrates the system as comprising a series of spaced supports 54, intervening between which is a single attachment between each cable 52 and the rail 10, I contemplate an installation in which the spaced supports 54 are in another than alternating relation with the cable to band-attachments. For example, the supports 54 may be so widely spaced as to provide for two or more points of band support, or the curvature of the wave portions 12 may be such as to position two or more curved portions 14 of the band between the successive posts.

As disclosed in Fig. 5, the preformed guard-rail 10 may be mounted directly upon the spaced supports 54, in which instance the bolt 38 fastens the terminal coil 16, as herein described. The short radius bends 14 are here provided with slots 76 running lengthwise of the rail, and have offset enlargements 78 on one side of the long axis of the slot, adapted to pass the heads 80 of wing headed bolts 82, that are carried by the supports 54, to which they are secured by nuts 84 engaging spring-lock washers 86 on the back side of the supports. Preferably, the wing heads 80 are of the tadepole type, in which a single arm 88 tangentially joins the main head portion, and are adapted to assume or retain the securing relation due to gravity acting upon the single off center arm.

According to the disclosure of Fig. 6, the spaced supports 54 constitute spaced portions of a continuous wall 90, which may take the form of a tunnel side wall, a bridge head, or the like. Where the spaced supports do not permit passage of the bolts 38 or 82, members of the lag screw type may be substituted therefor, the substitutions for the bolts 82, in addition to the round heads and single wing formations, having sockets in their heads adapted to receive an appropriate tool for turning the screw.

The preformed rail so fabricated is thereby adapted for ready mounting and removal, since the heads 80 may be turned until they align with the slots 76 and offsets 78, under which conditions the rails may be passed in either direction thereover. When the rails are in place, a quarter turn of the head 80 keeps the rail in place since the wings 88 present too much enlargement to be passed by the rail apertures. The securing means being so adjusted, the spring washers 86 retain the rail in cushioned engagement with the supports at the sharper bends 14, yet permit longitudinal shifting of the rail relative to the supports.

A modified form of undulating rail is disclosed in Figs. 8 to 13 inclusive, where the rail 100 has the bowed or wave portions 12 joining the reverse bends 14, and as groups of such are regularly spaced along the band and lineally spaced by flat portions 102 that gradually merge into the bends 14 of short radius, which in turn merge with the wave portions 12. At each end of the flat portion 102, just before it merges into the curves 14, the slots 76 with offset enlargements 78 are provided that are adapted to pass the wing heads 80 of the attaching bolts, as above described. For support of the rail thus preformed, a relatively rigid plate or other member 104 is attached to the support 54 where it is held by appropriate screw devices as the bolts 106 and nuts 108. The plate or member 104 is of sufficient length to span the arc of the bowed or wave portion 12 of the rail, and overlay the slots 76 in the flat portion, while the preformed rail member rests in the normally flexed relation during service. These overlapping end portions 110 of the plate are provided with plane slots 112 registering with the rail slots 76, and are adapted to slidably receive the shanks of the retaining bolts 82 in mounting the rail upon the plate or brackets 104. A bowed spring 114 has its crest 116 disposed against the back side of the plate 104, while each apertured end 117 passes the shank of the bolt 82. The bend of the spring tends to flatten slightly against the plate when one of the nuts 84 is run down against the washer 86. This connection of the rail and bracket holds the parts in firm but shiftable engagement, and permits the wave portion 12, when engaged, to flatten out or otherwise flex, or even shift lengthwise of the bracket 104 without bending. Designedly, the combined lengths of the slots 76 and 112 are such as to allow the wave 12 to be completely flattened out, and yet allow the rail as a flattened unit to slide to a limited extent along the bracket. The double arrangement of slots in the rail and bracket provide also for convenient tolerance of support setting when mounting the rail, since the spacing of the supports need not be so critical as when plain holes are used.

In Fig. 11, a modification is shown, where the rigid bracket member 104 is replaced by a bowed spring bracket 120 that is similarly secured to the support 54 by the bolts 106 as in the preceding form. The arc of the bowed portion is of similar contour to that of the wave 12 of the rail and merges gradually into the flat end portions 122 that are otherwise fashioned as the overlapping portions 110 of the bracket 104. Here, too, the spring clamp means involving the bolts 82 with the tension springs 114 hold the parts in firm engaging relation, though susceptible of shifting movement.

In either case of the preformed rail, it is preferred that the wave portions conform to the curve known as the cycloid, or that curve generated by a point within a circle as the circle rolls along a straight line without slippage. If the generating point is one located half-way between the center and the circumference of the rolling circle, the resulting curve will be a prolate cycloid, in which the wide radius curves 12 will have a radius about four times as long as the radius of the adjacent and reverse curves 14. By continuing the cycloid formation in uninterrupted sequence, a regularly undulating band will be formed as shown in Figs. 1, and 5 to 7 inclusive, where the wide curved flexing portions 12 lie on one side of a medial line in alternation with, and gradually merge into the stiffer narrow curved rigid portions 14, disposed on the opposite side of the medial line. By waving the rail member in that form, an undulating band of cycloidic configuration is produced in which the wave portions 12 are characterized by maximum flexibility for the stock or gage of material used, while the reverse bends 14 are rigid enough to transmit the impacting force to adjacent wave portions of the rail, and guard system as a whole.

While I have illustrated and described the wave portions of the guard rail band as configured to simulate a cycloid curve, I contemplate preforming the guard members according to other curves, and other ratios such as interconnected and merging portions of an ellipse, an hyperbola and the like, the principal requirement being that wide sweeping resilient curved portions 12 alternate with the sharper and stiffer bends 14, in such sequence that the waves 12 present a series of impact receiving portions, while the bends 14 act as support connections for the guard member and as means to distribute the shock of impact in diminishing amounts to successively remote wave sections. In performing these acts, the waves 12 flex somewhat on impact, but due to the stiffer portions 14 at each end of the wave, movement of the material in the wave portions will be transmitted to adjacent waves 12, in which a resultant and diminished flexing may occur, though the respective wave is not impacted.

Where the impact on the wave portion is at an acute angle to the general direction of the guard band, such as shown in Fig. 12, the wave portions 12 will change their flexure due to the force of the impact. If the angle of impact is sufficiently small, the wave flexing will be in the nature of increased curvature, while a larger angle of impact will produce a flattening of the wave portion. In Fig. 12, the flexure of the wave portion is illustrated as increased at one end, and decreased at the other, from the normal relation shown in dotted lines. Two points of reference on the preformed bend in the normal position are indicated by the letter A, and their shifted positions, due to flexing of the wave 12 are indicated by the letter B. That flexing of the waves absorbs a considerable portion of the shock, and at the same time the preformed band slides on its supports due to the slidable engagement, which sliding results in at least a partial flexing of the wave portions 12 on each side of the impacted wave. The spring roll at the end of the assembly either contracts or expands in response to a pull or a push respectively, of the band portions lying between the roll and the wave portion contacted.

Where the impact on the wave portion is substantially head on, or normal to the longitudinal extent of the band, there will be a substantial flattening out of the wave portions impacted, which will cause the adjacent recurved bends 14 to slide away from each other and cause a consequent flexing of the adjacent wave portions. The results of head-on impact are indicated in Fig. 13, where the flat band portion 102 is shown by dotted lines to be bowed out, with a consequent stretching or flattening of the adjacent wave portions, and a contraction of the spring roll. Fig. 13 also shows an alternative mounting for the spring roll 16, which here joins one end of the flat portion 102. It is here mounted on the side of the post or support 54, by inserting the bolt 38 through the post and the aperture 46 of the scroll. By such a means of mounting the terminal roll, a resilient support of at least three-quarters of a spire in inserted between the post union and the integral junction with the band portion 102, yet the whole assembly is capable of both longitudinal movement, and lateral flexing.

In the instance of the continually undulating guard band of the preferred form, there will obtain much the same conditions of flexure upon impact of a wave portion. The successive waves on each side of a flattened wave are so flexed as to cause a modified piling up of those waves, thus absorbing the greater portion of the shock of impact before the thrust is delivered to the spaced supports. A sliding impact will, therefore, cause an ironing out of the wave portions impacted, which, as they are disengaged from the brushing impact, will reflex and thereby absorb additional forces of the impact delivered to the system. It follows from this, that the piling up of the wave portions in front of the side sweeping vehicle, and the stretching of the wave portions in back of the same vehicle will operate to yieldably resist the force of impact and bring the erratic vehicle to rest with the least consequent danger to either the vehicle or the guard-rail system and with a minimum of shock to the occupants. The resilient bowed portions in front of the supports 54, protect the supports from rupture that ordinarily obtains upon impact from a vehicle, since the waved portion of the preformed band absorbs the shock of impact and distributes it to adjoining parts of the system, so that a greatly minimized component of the force is all that is received by the support in the region of the engaged wave.

While the embodiments of the present invention as herein disclosed, constitute preferred forms, it is to be understood that other forms might be adopted, all coming within the scope of the claims which follow.

What is claimed is as follows:

1. A traffic guard device, comprising in combination, a band of sheet metal having longitudinally extending long radius curves joining longitudinally extending short radius curves, means for shiftably supporting the band at each of the short radius curves, whereby the band portions may move lengthwise thereof and relative to the support when engaged.

2. A traffic guard device, comprising in combination, a preformed guard-rail of sheet metal having loops of long radius adjacent reverse loops of short radius, means yieldably supporting the rail at each short radius loop, and a spring scroll integrally formed at the terminal end of the rail.

3. A traffic guard device, comprising in combination, spaced supports, an undulating strip of sheet metal extending along the spaced supports, said undulating strip comprising curves of long radius alternating with reverse curves of short radius, and means located at each curve of short radius for securing the strip to the supports.

4. A traffic guard device, comprising in combination, spaced supports, an undulating strip of sheet metal extending along the spaced supports, said undulating strip comprising reverse curves alternating in the order of four (4) to one (1) in radius, and means for mounting the strip with the curves of greater dimension exposed to traffic, and the curves of smaller dimension slidably fixed to the supports.

5. A traffic guard device, comprising in combination, a series of spaced supports, a cycloidal formed strip of sheet metal extending along the supports, means for securing each alternating bend of the strip to a support, and means including the securing means for accommodating movement of the strip relative to the support, upon flexing of the formed strip.

6. A traffic guard device, comprising in combination, a series of spaced supports, a cycloidal formed strip of sheet metal extending along the supports, means for securing each alternating bend of the strip to a support, and means making for ready removal of the strip from the support, including key hole slots in the strip, and wing headed bolts adapted to pass therethrough.

7. A traffic guard device, comprising in combination, a strip of sheet metal preformed into a successive cycloid extending from end to end of the strip, a series of spaced supports, a pair of spaced cables extending along the supports, and means slidably mounting the metal strip on the cables.

8. The combination set forth in claim 7, wherein an end portion of the metal strip provides an open spring scroll, a bolt passes through a plurality of the convolutions of the scroll to secure the scroll to an end support, and the cables pass through the scroll and are tensioned to place the strip under endwise compression.

9. In a traffic guard device, the combination with spaced supports, of flexible cables secured directly to the supports, an undulating strip of sheet metal extending longitudinally along and on the traffic bearing side of the cables, said strip undulations comprising a set of wide curves alternating with reversed narrow curves, and means connecting the strip to the cables at points between the supports, including clip connections at each of the narrow curves of the strip, thus holding the wide curves of the strip spaced from the supports.

10. In a traffic guard device, the combination with spaced supports, of a spring steel strip bent in the form of a prolate cycloid and having one end portion rolled into a loose coiled spring terminal, a pair of cables spanning the supports, and means uniting the cables and steel strip into a rigid but yieldable guard assembly, including eye pieces about the cables and fixed to the strip at each alternating bend, the convolutions of the terminal spring being apertured to pass the end of the cables, means securing the terminal spring to a support, and means engaging the cables and terminal spring holding the strip under endwise compression.

11. In a traffic guard device, the combination with spaced supports, of spring metal strip sections joined in end to end relation and each section being bowed at regular intervals throughout its lineal extent to provide a series of broadly crowned portions adapted to yieldably flex under vehicle impact, each end section having its unjoined end thereof convoluted to form a loosely coiled spring terminal member for the strip, means securing the terminal member to one of said supports, including provisions for expansion and contraction of the terminal member incident to changes in the body of the strip, and means at each juncture of the crowned portions for shiftably attaching the strips to the supports.

12. In a traffic guard device, the combination with spaced supports, of spring metal strip sections joined in end to end relation and each section being bowed at regular intervals throughout its lineal extent to provide a series of broadly crowned portions adapted to yieldably flex under vehicle impact, each end section having its unjoined end thereof convoluted to form a loosely coiled spring terminal member for the strip, means securing the terminal member to one of said supports, including provisions for expansion and contraction of the terminal member incident to changes in the body of the strip, a pair of cables extending along the line of supports, said cable ends being secured to an outside convolution of the terminal member whereby the crowned portions of the strips are normally under at least slight endwise compression, means securing the cables between their ends to the spaced supports, and means at the junctures of the crowned portions supporting the strips in spaced slidable relation upon the cables at points between the supports.

13. In a traffic guard device, the combination with spaced supports, of spring metal strips having gradually curved bowed portions occurring at regular intervals throughout their lineal extent, the ends of the bowed portions merging into recurved portions of relatively shorter radius, means engaging the strips at the recurved portions supporting the strips for limited longitudinal movement relative to the supports, and means normally restraining longitudinal movement of the strips, said bowed strip portions facing the line of traffic and adapted to yieldably resist the impact of an engaging vehicle by flattening out and transmitting the force of the impact to remote portions of the strips.

14. In a traffic guard device, the combination with spaced supports, of a spring metal strip having gradually curved bowed portions, the ends of which merge without angular bends into recurved portions of shorter radius, one end of said strip having a terminal coil of one and one-half spires integral with the body of the strip, and means securing the strip for flexing and lineal movement relative to the supports, including slip connections located at the recurved portions of the strip, and a lost motion connection for the terminal coil passing through the successive coils thereof substantially one spire apart.

15. In a traffic guard device, having a preformed strip of sheet metal serving as a rail, the combination of a terminal support formed integrally with one end of the rail, comprising a cylindrical roll lying wholly on one side of the body of the strip, and whose successive convolutions are widely spaced, the two outermost convolutions of said roll having aligned apertures, one of which comprises a slot, said apertures adapted to receive a mounting screw for compressing the convolutions adjacent the apertures against a support, said slot permitting expansion and contraction of roll incident to movement of the preformed portion of the roll.

16. A guard rail construction, comprising metal plate sections, a series of posts for supporting the sections, bracket members carried by each post and provided with slots, said plate sections having spaced bowed resilient portions joined by flat portions extending into general parallelism with the slotted portions of the brackets, said flat plate portions being slotted in general registry with the bracket slots, headed members projecting through the registering slots of the plate and bracket, and spring means engaging the headed members and the bracket adapted to hold the plate and bracket in firm engagement but provide for slippage of the plate on the bracket.

17. The combination set forth in claim 16, wherein the bowed plate portions are disposed opposite the bracket portions, and are adapted to flatten out upon impact and slide the slotted portions of the plate relative to the bracket.

18. The combination set forth in claim 16, wherein the bracket member comprises a bowed resilient member having terminating flat end portions providing the bracket slots, and in which the plate bowed portions and bracket when united form a substantially full elliptic spring in front of each post.

19. The combination set forth in claim 16, wherein the plate slots have offset enlargements at one end thereof, and wherein the headed members comprise wing headed bolts adapted when oriented to pass through the plate slots, and adapted to normally assume a position in which the heads are restrained from passing through the plate slots.

JOE B. BRADSHAW.